United States Patent
Jiang et al.

(10) Patent No.: US 12,169,731 B2
(45) Date of Patent: Dec. 17, 2024

(54) PROCESSING UNIT RESET BASED ON GROUP CONFIGURATION

(71) Applicant: ATI TECHNOLOGIES ULC, Markham (CA)

(72) Inventors: Yinan Jiang, Markham (CA); Shaoyun Liu, Markham (CA); Aranyak Mishra, Markham (CA); Maria Joo, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 421 days.

(21) Appl. No.: 17/564,144

(22) Filed: Dec. 28, 2021

(65) Prior Publication Data
US 2023/0205565 A1    Jun. 29, 2023

(51) Int. Cl.
*G06F 9/455* (2018.01)
*G06F 9/38* (2018.01)
*G06F 9/4401* (2018.01)

(52) U.S. Cl.
CPC ........ *G06F 9/45558* (2013.01); *G06F 9/3877* (2013.01); *G06F 9/4411* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 9,489,924 B2* | 11/2016 | Schulze | G09G 5/363 |
| 2012/0056891 A1* | 3/2012 | Chakraborty | G06F 9/45558 345/522 |
| 2016/0062424 A1* | 3/2016 | Thomas | G06F 1/24 713/1 |
| 2019/0094946 A1* | 3/2019 | Pillilli | G06F 1/28 |

\* cited by examiner

*Primary Examiner* — Umut Onat

(57) ABSTRACT

A processing system selects a reset sequence based on a sideband connected configuration of a plurality of processing units. The processing system identifies whether the plurality of processing units is in the sideband connected configuration, so that the plurality of processing units works together on assigned operations. Based on the identification, the processing system selects and executes one of a plurality of available reset sequences. The processing system is thus able to tailor the executed reset sequence for the configuration of the plurality of processing units, thereby reducing the number of overall system resets and improving processing efficiency.

20 Claims, 4 Drawing Sheets

PROCESSING UNIT RESET BASED ON GROUP CONFIGURATION

BACKGROUND

To enhance processing efficiency, some processing systems are able to operate a plurality of processing units in a sideband connected mode, wherein the different processing units work together to execute a given set of operations. For example, some processing systems include a plurality of graphics processing units (GPUs) that, when operating in the passthrough mode, execute graphics operations on behalf of one or more virtual machines (VMs). Furthermore, the sideband connected mode virtualizes the plurality of GPUs, such that the plurality of GPUs appears to the one or more VMs as a single or multiple GPUs, thereby allowing a variety of VMs to control the plurality of GPUs via a conventional interface tailored to a single GPU. However, in some cases, during a reboot of the VM, the conventional interface will attempt to execute a reboot sequence that is not suitable for the plurality of GPUs working together, resulting in operational errors, or requiring the operating system to execute a full reset, thereby reducing overall processing efficiency.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
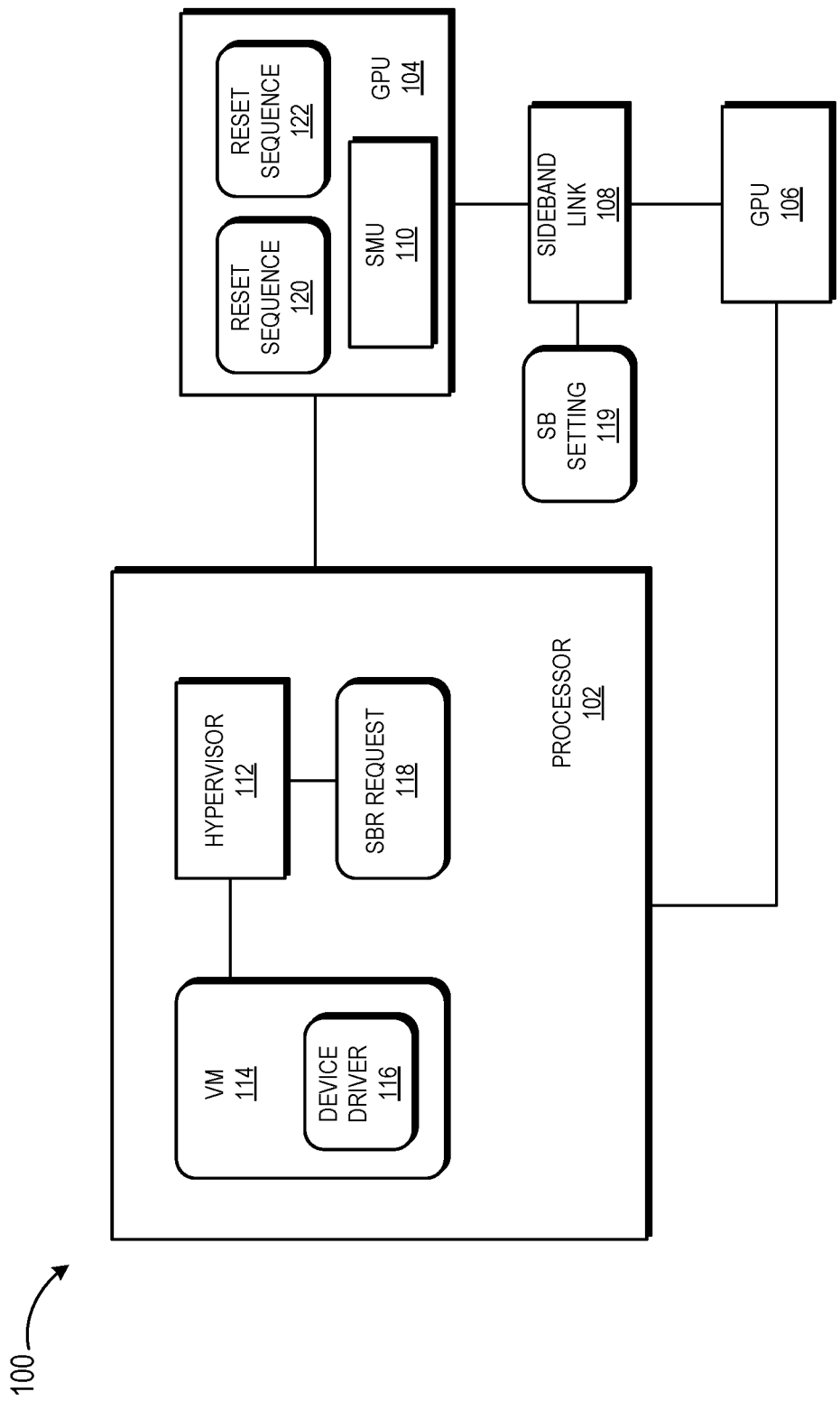
FIG. 1 is a block diagram of a processing system that selects a reset sequence based on a sideband connected configuration of a plurality of processing units in accordance with some embodiments.

FIGS. 1-4 illustrate techniques for selecting, at a processing system, a reset sequence based on a sideband connected configuration of a plurality of processing units. The processing system identifies whether the plurality of processing units is in the sideband connected configuration, so that the plurality of processing units works together on assigned operations. Based on the identification, the processing system selects and executes one of a plurality of available reset sequences. The processing system is thus able to tailor the executed reset sequence for the configuration of the plurality of processing units, thereby reducing the number of overall system resets and improving processing efficiency.

To illustrate via an example, some processing systems employ a plurality of graphics processing units (GPUs) that can be placed in a sideband connected configuration. In the sideband connected configuration, the GPUs receive graphics commands from a virtual machine (VM), and communicate via a sideband link in order to collectively execute the graphics commands. In order for the GPUs to be properly reset in the sideband connected configuration, the individual GPUs must all be reset within a fixed time window. Otherwise, one or more of the GPUs will fail to re-setup the sideband link again and fail to re-initialize properly, and therefore will not function properly until a full system reset is executed.

In a conventional processing system, a hypervisor initiates execution of a specified reset sequence in response to a reset of the VM. In particular, for a system that has plurality of GPU devices, the hypervisor issues a secondary bus reset (SBR) request to each of the plurality of GPUs. However, the SBR requests are issued to the individual GPUs at variable times. In at least in some cases, these variable times fall outside the fixed time window for proper reset, resulting in a sideband link handshake failure due to a time out condition and an initialization failure at one or more of the GPUs, and requiring a full system reset to restore the GPUs to proper operating condition.

In contrast to the conventional approach, using the techniques described herein, a processing system selects a different reset sequence when the plurality of GPUs is in the sideband connected configuration. For example, in some embodiments, when the GPUs are in the non-sideband connected configuration, the processing system selects and executes a reset sequence similar to the one described above. However, when the GPUs are in the sideband connected configuration, the processing system selects and executes a reset sequence wherein the hypervisor issues the SBR request in response to the VM reset. Responsive to the SBR request, the GPU indicates an acknowledgement to the hypervisor, but does not perform real SBR operations to the GPUs. Instead, after the VM reset is complete, a device driver of the VM sends other type of reset requests to each individual GPU and ensures that the reset requests are issued within the fixed time window. After the GPUs have completed reset in response to the requests, the device driver re-initializes each GPU. Thus, when the GPUs are in the sideband connected configuration, the processing system selects and executes a reset sequence that ensures the GPUs are properly reset and initialized, without requiring a full reset of the processing system.

FIG. 1 illustrates a block diagram of a processing system 100 that is configured to select and execute one of a plurality of reset sequences based on a sideband connected configuration of a plurality of processing units. The example of FIG. 1 is discussed with respect to some example embodiments wherein the processing units are GPUs. However, it will be appreciated that, in other embodiments, the techniques described herein are applied to other types of processing units, such as vector processing units, parallel processing units, machine learning processing units, artificial intelligence processing units, and the like.

The processing system 100 is generally configured to execute sets of instructions, such as virtual machines (VMs), operating systems, applications, and the like. The processing system thereby carries out specified tasks, as indicated by the sets of instructions, on behalf of an electronic device. Accordingly, in different embodiments the processing system 100 is incorporated into one of a variety of electronic devices, such as a server, a desktop computer, a laptop computer, a game console, a tablet, a smartphone, and the like. To support execution of the sets of instructions, the processing system 100 includes a processor 102 and a plurality of GPUs, designated GPU 104 and GPU 106. It will be appreciated that although the processor 102 and the GPUs 104 and 106 are illustrated as separate blocks, in some embodiments one or more of the processor 102 and the GPUs 104 and 106 are collectively incorporated in a single integrated circuit or integrated circuit package. For example, in some embodiments the processor 102, the GPU 104, and GPU 106 are formed as different semiconductor dies, and each of the three dies are incorporated in a multi-chip integrated circuit.

The processor 102 is a general-purpose processor and is generally configured to execute sets of general-purpose instructions. Accordingly, in some embodiments the processor 102 is a central processing unit (CPU) having one or more processor cores (not shown) each including one or more instruction pipelines configured to execute program threads, representing portions of the sets of instructions, in a pipelined fashion. In the course of executing the program threads, the instruction pipelines generate graphics commands (e.g., draw commands), representing requests for specified graphics operations.

The GPUs 104 and 106 are graphics processing units generally configured to receive the graphics commands and execute the corresponding operations indicated by the graphics commands, such as drawing operations, texture operations, shader operations, tessellation operations, vector processing operations, and the like. Thus, in some embodiments, each of the GPUs 104 and 106 includes a set of processing elements, such as a set of workgroup processors, configured to execute sets of operations (sometimes referred to as waves) in parallel, thereby satisfying the graphics commands issued by the processor 102.

The GPUs 104 and 106 are configurable to operate in either of two configurations: a sideband connected configuration and a sideband connected configuration. In the sideband connected configuration, the GPUs 104 and 106 execute each of one or more of the received graphics commands collectively, using the resources of both the GPUs 104 and 106. The GPUs 104 and 106 thus appear to programs executing at the processor 102 as two physical GPUs but the application can schedule a cooperative workload for these two GPUs as if they are one single physical GPUs. In the depicted example, the GPUs 104 and 106 are connected by a sideband link 108 that allows communication between the GPUs without consuming communication bandwidth of the communication links between the GPUs 104 and 106 and the processor 102. For example, in some embodiments the sideband link is a communication fabric used by the GPUs 104 and 106 to communicate, and in particular to coordinate execution of operations when the GPUs 104 and 106 are in the sideband connected configuration.

In the non-sideband connected configuration, the graphics commands issued by the processor 102 are executed by the GPUs 104 and 106 individually. For example, in the non-sideband connected mode, each of the GPUs 104 and 106 is assigned different graphics commands based on specified criteria, such as the executing program that generated the command. The GPUs 104 and 106 thus appear to the programs executing at the processor 102 as distinct physical GPUs.

In the example of FIG. 1, the processing system 100 implements a virtualized computing environment, wherein virtual machines (e.g., VM 114) are executed at the processor and the processing system 100 exposes physical resources of the system to different VMs as if the physical resources were dedicated physical devices accessed at the VM. For example, in some embodiments the processing system 100 is generally configured to virtualize the GPUs 104 and 106, so that the physical resources of the GPUs 104 and 106 are concurrently employed by multiple VMs (e.g., in a time-multiplexed fashion), but the physical resources appear to each of the multiple VMs as a physical GPU dedicated to that VM. Furthermore, when the GPUs 104 and 106 are in the sideband connected configuration, the processing system 100 virtualizes the GPUs 104 and 106 together, so that even when the operations associated with a given command are distributed across both the GPU 104 and the GPU 106, the resources of the GPUs 104 and 106 appear to a given VM as two physical GPUs but collectively work together and are dedicated to that VM.

Each of the GPUs 104 and 106 includes a system management unit (SMU), such as SMU 110 of the GPU 104. The SMU 110 is a hardware unit, software module, or combination thereof configured to control different hardware resources of the GPU 104, and to provide an interface between those hardware resources and other modules of the processing system 100, including the hypervisor 112. In particular, the SMU 110 is configured to control reset operations GPU 104 as described further herein. GPU 106 also includes an SMU (not shown) configured similarly to the SMU 110.

To support virtualization, the processor 102 a hypervisor 112, which in different embodiments is a hardware unit, software module, or combination thereof configured to implement virtualization functionality at the processing system 100. In particular, the hypervisor 112 is configured to provide an interface between operating systems of the executing virtual machines and the hardware resources of the processing system 100. Thus, in some embodiments, the hypervisor 112 receives instructions and commands from an operating system targeted to a virtual hardware resource (that is, to a resource that appears to the operating system to be a dedicated physical hardware resource, such as a dedicated GPU). The hypervisor 112 translates those commands and instructions to operations to be executed at the hardware resources of the processing system 100, and further translates any responses from the hardware resources to the format expected by the operating system. The hypervisor 112 thus provides an emulation layer between the operating systems of the VMs and the hardware resources of the processing system 100, so that those processing resources appear to each VM as a dedicated physical resource, such as a dedicated GPU.

In some embodiments, when the VM 114 is restarted, the hypervisor 112 detects the restart operation, and in response initiates a reset at the GPUs 104 and 106, as well as any other devices of the processing system 100 that are assigned to the VM 114. When the device to be reset, such as the GPUs 104 and 106 declares support of secondary bus reset (SBR), in response, the hypervisor 112 generates an SBR request 118 to reset the devices, including the GPUs 104 and 106. However, as noted above, in at least some embodiments executing the same reset sequence for the GPUs 104 and 106 in both the sideband connected configuration and the non-sideband connected configuration leads to re-initialization errors in at least one of the configurations.

Accordingly, after a GPU receives the SBR request 118, the SMU of the GPU (e.g., SMU 110) is configured to select one of a plurality of reset sequences (e.g., reset sequences 120 and 121) based on the sideband connected configuration setting 119. The SMU 110 thus selects the reset sequence that is designed to properly reset the GPUs 104 and 106 in their current configuration.

To illustrate, in some embodiments a device driver 116 of the VM 114 configures the GPUs 104 and 106 in one of the sideband connected and non-sideband connected configurations and sets the sideband connected configuration setting 119 to indicate the selected configuration. In response to receiving the SBR request 118, the SMU 110 accesses the sideband connected configuration setting 119 to determine whether the GPUs 104 and 106 are in the non-sideband connected configuration or the sideband connected configuration. In response to determining that the GPUs 104 and 106 are in the non-sideband connected configuration, the SMU 110 selects the reset sequence 120. Following this reset sequence, the SMU 110 sends an acknowledgement of the SBR request 118 to the hypervisor 112. In some embodiments, because the GPUs 104 and 106 operate independently in the non-sideband connected configuration, each GPU is able to be reset independently, without affecting GPU operations at the other GPU. Accordingly, in the non-sideband connected configuration, and following the reset sequence 120, the hypervisor 112 sends the reset requests at variable times (that is, at times that are not fixed relative to each other).

In response to determining, based on the sideband connected configuration setting 119, that the GPUs 104 and 106 are in the sideband connected configuration, the SMU 110 selects the reset sequence 122. Following this reset sequence, the SMU 110 sends the acknowledgement of the SBR request 118, indicating to the hypervisor 112 that the SBR reset has been, or will be, executed at the GPUs 104 and 106. Thus, under the reset sequence 122, it appears to the hypervisor 112 that the SBR reset process proceeds normally, as if the GPUs 104 and 106 are in the non-sideband connected configuration. The hypervisor 112 thus enables implementation of different reset sequences without redesign or reconfiguration of the hypervisor 112.

Under the reset sequence 122, the SMU 110 does not immediately issue SBR requests to the GPUs 104 and 106. Instead, the VM 114 first completes its reset process. After the reset of the VM 114, the VM 114 starts up and loads in the device driver 116. Upon the device driver 116 loading, the driver instructs the SMU 110 on each GPU to send another type of reset request to each of the GPUs 104 and 106. Further, the device driver 116 instructs the SMU to send the specific type of reset request within a specified time window, to ensure proper reset of the GPUs 104 and 106 in the sideband connected configuration. For example, in some embodiments, in order for the GPUs 104 and 106 to be properly reset in the sideband connected configuration, the GPUs 104 and 106 must each receive the SBR reset request within N nanoseconds of each other. After the GPUs 104 and 106 complete the SBR reset, the device driver 116 initializes each GPU, by, for example, reloading firmware, programming register settings, initializing the GPU's render and compute engines, and setting up interrupt handlers.

Figure 2:
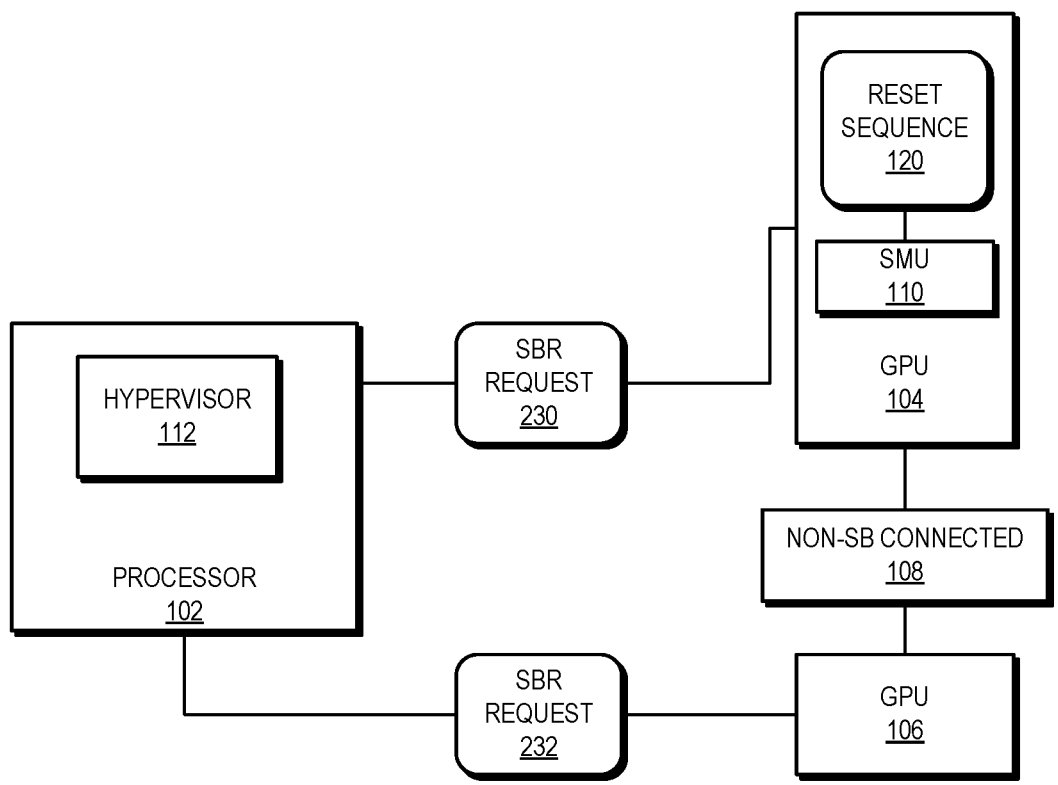
FIG. 2 is a block diagram illustrating an example of the processing system of FIG. 1 executing a first reset sequence based on the plurality of processing units being in a non-sideband connected mode in accordance with some embodiments.

FIG. 2 is a block diagram illustrating an example of the processing system 100 selecting and executing the reset sequence 120 in accordance with some embodiments. In the depicted example, the GPUs 104 and 106 are in the non-sideband connected mode. Accordingly, the device driver 116 has set the sideband connected configuration setting 119 to indicate the non-sideband connected mode. In response to receiving the SBR request 118, the SMU 110 selects, based on the sideband connected configuration setting 119, the reset sequence 120. Using this sequence, the hypervisor 112 issues an SBR request 230 to the GPU 104, and also issues an SBR request 232 to the GPU 106. Thus, under the reset sequence 120, the SMU 110 issues the SBR requests 230 and 232 in response to the SBR request 118, without waiting for reset of the VM 114. Further, the hypervisor 112 issues the SBR requests 230 and 232 at variable times, and in particular without forcing the SBR requests 230 and 232 to be issued in a particular time window.

Figure 3:
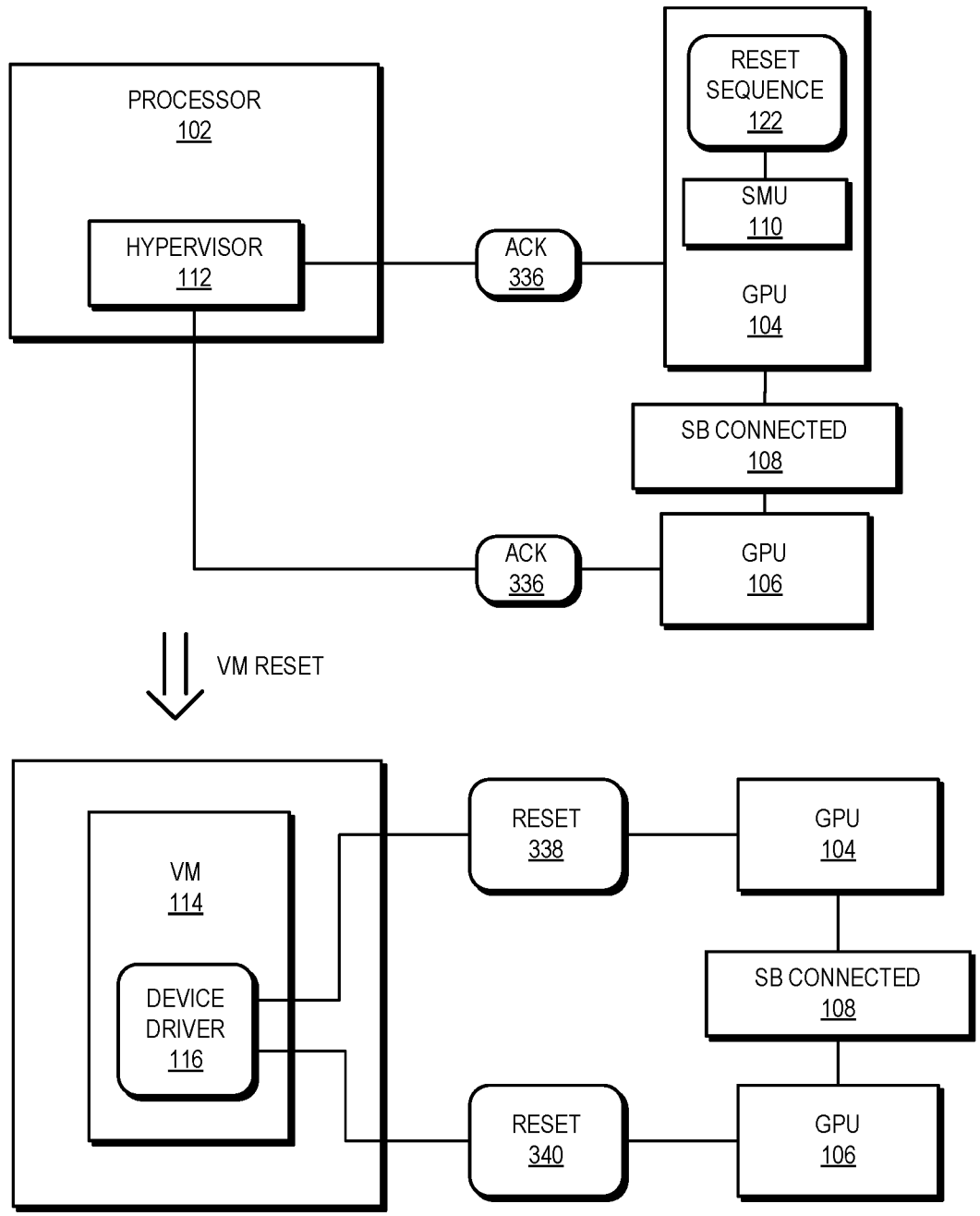
FIG. 3 is a block diagram illustrating an example of the processing system of FIG. 1 executing a second reset sequence based on the plurality of processing units being in a sideband connected mode in accordance with some embodiments.

FIG. 3 is a block diagram illustrating an example of the processing system 100 selecting and executing the reset sequence 120 in accordance with some embodiments. In the depicted example, the GPUs 104 and 106 are in the sideband connected mode. Accordingly, the device driver 116 has set the sideband connected configuration setting 119 to indicate the sideband connected mode. In response to receiving the SBR request 118, the SMU 110 selects, based on the sideband connected configuration setting 119, the reset sequence 122. To implement this sequence, the SMU 110 first sends an acknowledgement 336 of the SBR request 118 to the hypervisor 112. In at least some embodiments, the acknowledgement 336 shares the format of the acknowledgement sent under reset sequence 122. That is, the acknowledgement 336 indicates to the hypervisor 112 that the SBR request 118 has been satisfied, even though the reset of the GPUs 104 and 106 has not been completed.

Under the reset sequence 122, the SMU 110 does not immediately issue reset requests to the GPUs 104 and 106 in response to the SBR request 118. Instead, the processing system 100 waits for the restart of the VM 114 to complete. Once the VM 114 has completed restart, the device driver 116 issues, via the SMU 110, another reset request, which will reset the sideband link, 338 and 340 to the GPUs 104 and 106, respectively. In at least some embodiments, the device driver 116 of VM 114 issues the reset requests 338 and 340 within a specified time window to ensure proper reset of the GPUs 104 and 106 in the sideband connected configuration.

Figure 4:
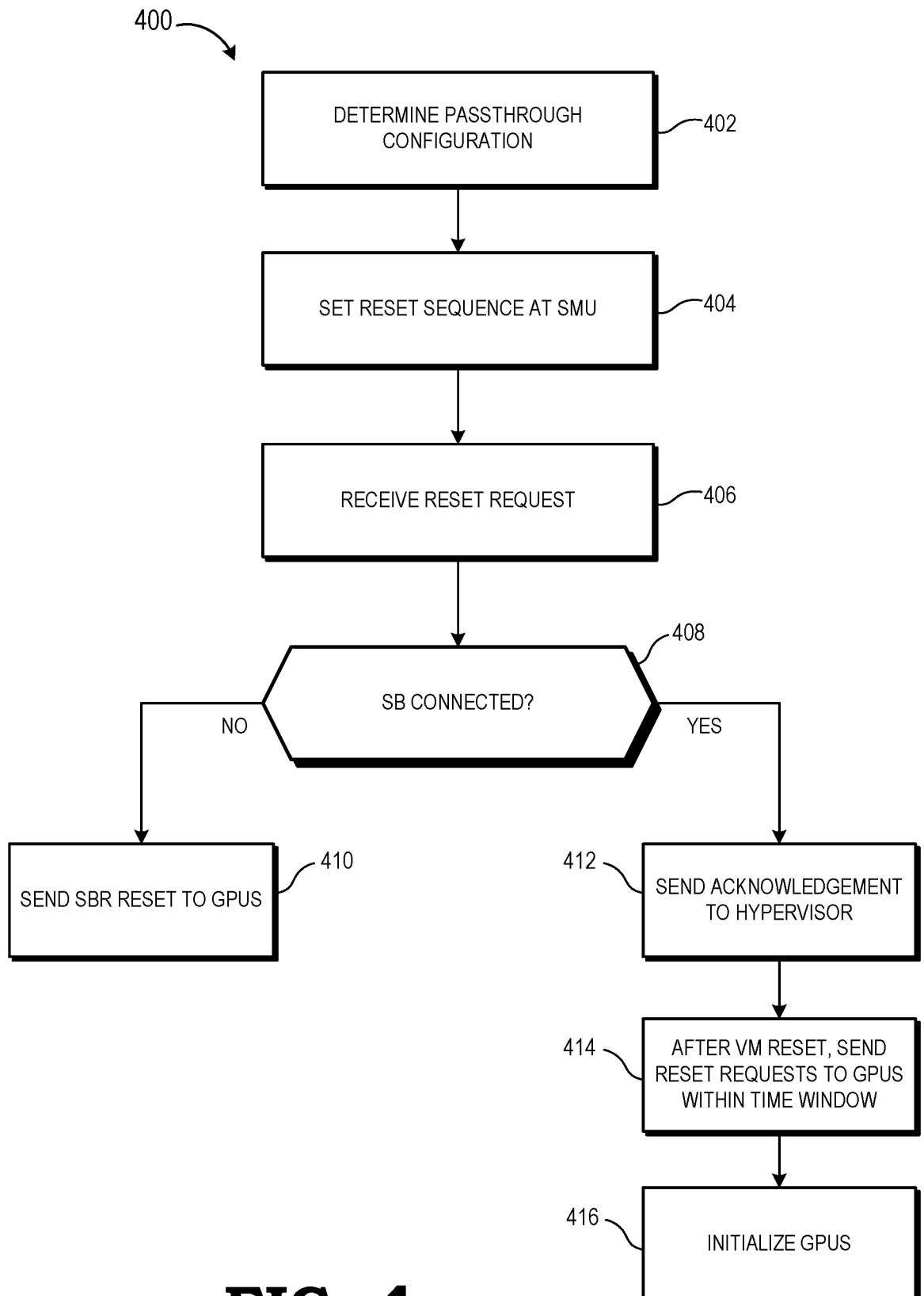
FIG. 4 is a flow diagram of a method of selecting a reset sequence based on a sideband connected configuration of a plurality of processing units in accordance with some embodiments.

FIG. 4 illustrates a flow diagram of a method 400 of selecting a reset sequence based on a sideband connected configuration of a plurality of processing units in accordance with some embodiments. The method 400 is described with respect to an example implementation at the processing system 100 of FIG. 1. However, in other embodiments the method 400 is implemented at processing systems having different configurations than the processing system 100, such as at processing systems having additional processing units, processing units of different types, and the like, or any combination thereof.

At block 402, the device driver 116 determines the sideband connected configuration of the GPUs 104 and 106. In some embodiments, the sideband connected configuration is set by software executing at the VM 114, such as by an operating system of the VM 114, or by an application executing at the VM 114. At block 404, the device driver 116 sets the sideband connected configuration setting 119 to indicate the sideband connected configuration, thereby setting the reset sequence for the GPUs 104 and 106 to one of the reset sequence 120 and the reset sequence 122.

At block 406, the SMU 110 receives the SBR reset request 118 from the hypervisor 112. In response, at block 408, the SMU 110 determines, based on the sideband connected configuration setting 119, if the GPUs 104 and 106 are in the sideband connected configuration or in the non-sideband connected configuration. In response to the GPUs 104 and 106 being in the non-sideband connected configuration, the method flow moves to block 410 and the SMU issues the SBR requests 230 and 232 to the GPUs 104 and 106, and without ensuring that the SBR requests 230 and 232 are issued within a specified time window.

Returning to block 408, if the GPUs 104 and 106 are in the sideband connected mode, the method flow moves to block 412, and the SMU 110 sends an acknowledgment of the SBR request 118 to the hypervisor 112. At block 414, after the VM 114 has completed its restart, the device driver 116 is loaded, device driver sends reset requests 338 and 340 to the GPUs 104 and 106, respectively. The device driver 116 ensures that the reset requests 338 and 340 are issued to the GPUs 104 and 106 within a specified time window, thereby ensuring proper reset of the GPUs 104 and 106 in the sideband connected configuration. At block 416, after the GPUs 104 and 106 have completed reset, the VM 114 initializes the GPUs.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   identifying, by a processing unit of a plurality of processing units (PUs), a sideband communication configuration of the plurality of PUs;
   in response to receiving, by the processing unit, a reset request for the plurality of PUs, selecting a reset sequence for the plurality of PUs based on the sideband communication configuration; and
   executing, at the plurality of PUs, the reset sequence.

2. The method of claim 1, wherein selecting the reset sequence comprises:
   selecting a first reset sequence in response to identifying the sideband communication configuration as a connected configuration; and
   selecting a second reset sequence in response to identifying the sideband communication configuration as a non-connected configuration.

3. The method of claim 2, wherein the reset request comprises a request for the second reset sequence.

4. The method of claim 3, wherein the reset request is received from a reset requestor, and wherein the first reset sequence comprises:
   sending an indication to the reset requestor that the second reset sequence has been executed.

5. The method of claim 4, wherein the reset requestor is a hypervisor.

6. The method of claim 4, wherein the first reset sequence comprises:
   initiating, at device driver of a virtual machine, a reset at each of the plurality of PUs.

7. The method of claim 6, wherein initiating the reset at each of the plurality of PUs comprises:
   initiating the reset at each of the plurality of PUs within a specified time window.

8. The method of claim 6, wherein the first reset sequence comprises:
   the device driver initializing each of the plurality of PUs after resetting each of the plurality of PUs.

9. The method of claim 1, wherein the reset request comprises a secondary bus reset request.

10. A non-transitory computer readable medium tangibly embodying instructions to manipulate a processor, the instructions comprising instructions to:
    receive a reset request to execute a first reset sequence for a plurality of processing units (PUs); and
    in response to determining that a sideband communication configuration for the plurality of PUs is a first configuration, execute, at the plurality of PUs and responsive to the reset request, a second reset sequence for the plurality of PUs, the second reset sequence different from the first reset sequence.

11. The non-transitory computer readable medium of claim 10, wherein the reset request is received from a requestor, and wherein the second reset sequence comprises:
    indicating to the requestor that the first reset sequence has been executed.

12. The non-transitory computer readable medium of claim 10, wherein the second reset sequence comprises:
    delaying a reset of the plurality of PUs until a virtual machine has been rebooted.

13. A processing system, comprising:
    a plurality of graphics processing units (PUs), a first PU of the plurality of PUs configured to:
    identify a sideband communication configuration of the plurality of PUs;

in response to receiving a reset request, select a reset sequence for the first PU based on the sideband communication configuration; and execute the selected reset sequence.

14. The processing system of claim 13, wherein the SMU-first PU is to select the reset sequence by:

selecting a first reset sequence in response to identifying the sideband communication configuration as a connected configuration; and selecting a second reset sequence in response to identifying the sideband communication configuration as a non-connected configuration.

15. The processing system of claim 14, wherein the reset request comprises a request for the second reset sequence.

16. The processing system of claim 15, wherein the reset request is received from a reset requestor, and wherein the first reset sequence comprises:

sending an indication to the reset requestor that the second reset sequence has been executed.

17. The processing system of claim 16, wherein the reset requestor is a hypervisor of the processing system.

18. The processing system of claim 16, wherein the first reset sequence comprises:

initiating, at device driver of a virtual machine executing at the processing system, a reset at each of the plurality of PUs.

19. The processing system of claim 18, wherein initiating the reset at each of the plurality of PUs comprises:

initiating the reset at each of the plurality of PUs within a specified time window.

20. The processing system of claim 18, wherein the first reset sequence comprises:

the device driver initializing each of the plurality of PUs after resetting each of the plurality of PUs.

* * * * *